United States Patent [19]

Rudy

[11] 4,287,250

[45] * Sep. 1, 1981

[54] ELASTOMERIC CUSHIONING DEVICES FOR PRODUCTS AND OBJECTS

[75] Inventor: Marion F. Rudy, Northridge, Calif.

[73] Assignee: Robert C. Bogert, Woodland Hills, Calif. ; a part interest

[*] Notice: The portion of the term of this patent subsequent to Jan. 15, 1997, has been disclaimed.

[21] Appl. No.: 7,358

[22] Filed: Jan. 29, 1979

Related U.S. Application Data

[63] Continuation-in-part of Ser. No. 844,080, Oct. 20, 1977, abandoned.

[51] Int. Cl.³ .......................... B32B 3/12; B32B 3/06
[52] U.S. Cl. ..................................... 428/166; 5/449; 206/522; 428/178; 428/198
[58] Field of Search ................... 428/69, 72, 158, 166, 428/178, 198; 156/145, 147; 5/341, 365, 368, 449; 2/272; 9/11 A, 13; 206/522

[56] References Cited

U.S. PATENT DOCUMENTS

| | | | |
|---|---|---|---|
| 2,997,291 | 8/1961 | Stultz | 267/64 |
| 3,047,040 | 7/1962 | Gross | 267/65 A |
| 3,366,523 | 1/1968 | Weber | 156/145 |
| 3,410,004 | 11/1968 | Finn | 36/93 |
| 3,760,056 | 9/1973 | Rudy | 36/71 |

FOREIGN PATENT DOCUMENTS

| | | | |
|---|---|---|---|
| 712134 | 6/1965 | Canada | 428/158 |
| 1145932 | 3/1969 | United Kingdom . | |

Primary Examiner—Paul J. Thibodeau
Attorney, Agent, or Firm—Subkow and Kriegel

[57] ABSTRACT

Devices for packaging and/or cushioning products and objects, the devices including permeable elastomeric sheets sealed together at predetermined locations to form separate and discrete chambers, or intercommunicating chambers, inflated initially with a gaseous medium comprising a gas other than air, oxygen or nitrogen which has a very low diffusion rate from each chamber through the elastomeric sheets, ambient air diffusing more readily through the sheets into each inflated chamber to provide a total pressure therein which is the sum of the partial pressure of the air in the chamber and the partial pressure of the gas in the chamber. Not only does the air diffusing into a chamber increase the total pressure therein above the initial inflation pressure of the gas, but the air in the chamber inhibits outward diffusion of the gas from the chamber or compensates for any loss of pressure caused by such outward diffusion of the gas.

28 Claims, 16 Drawing Figures

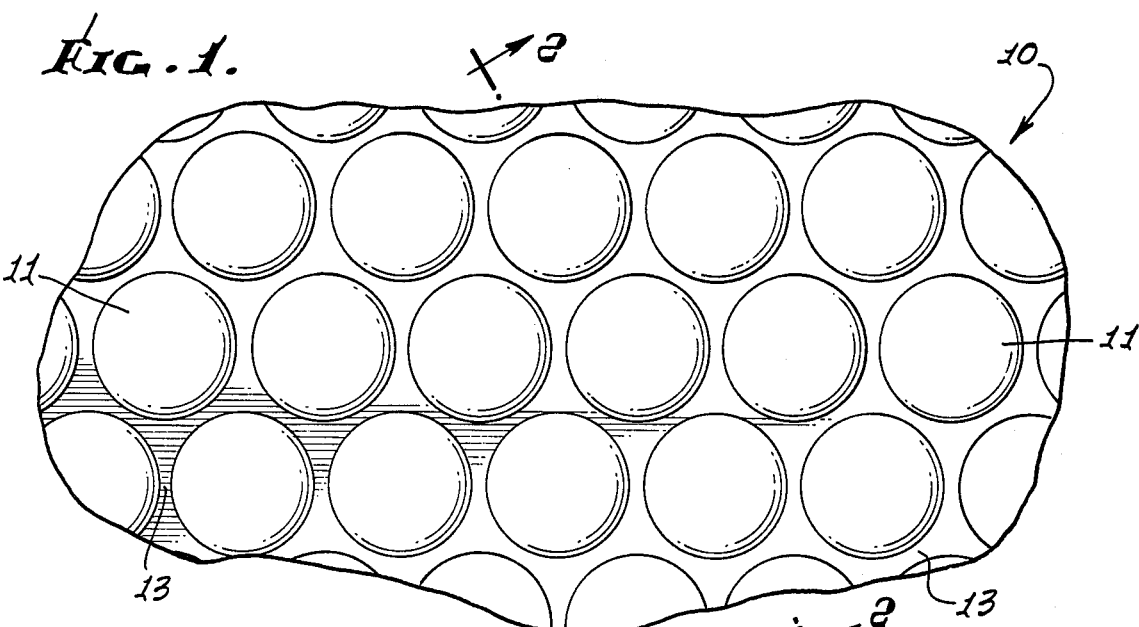
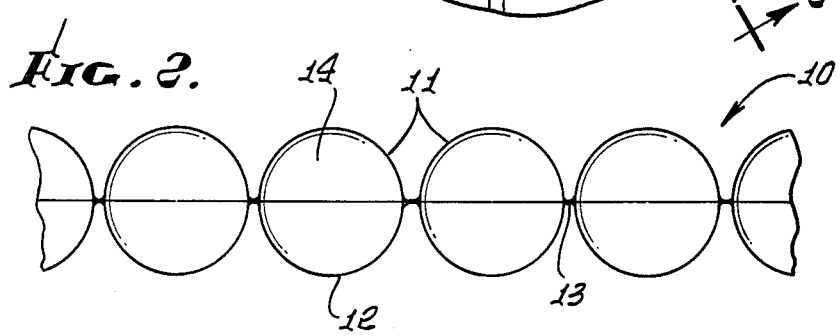
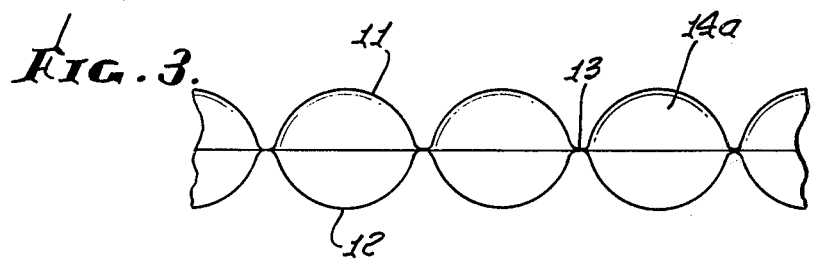
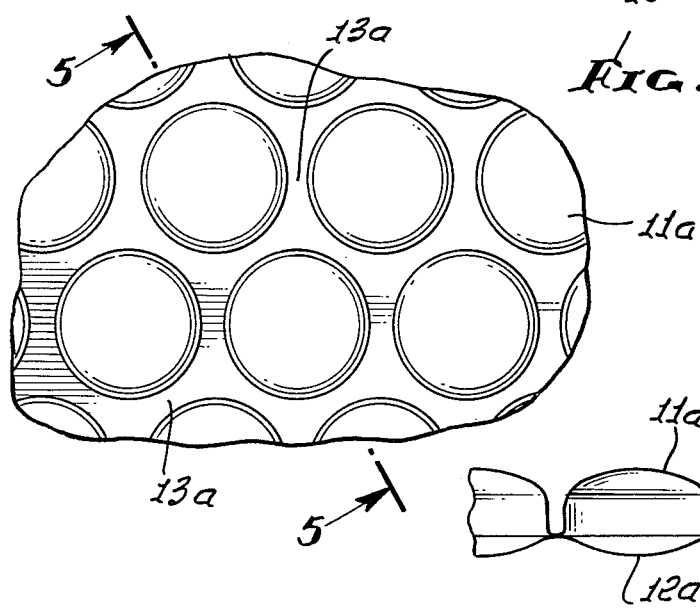
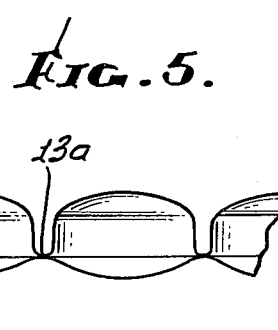

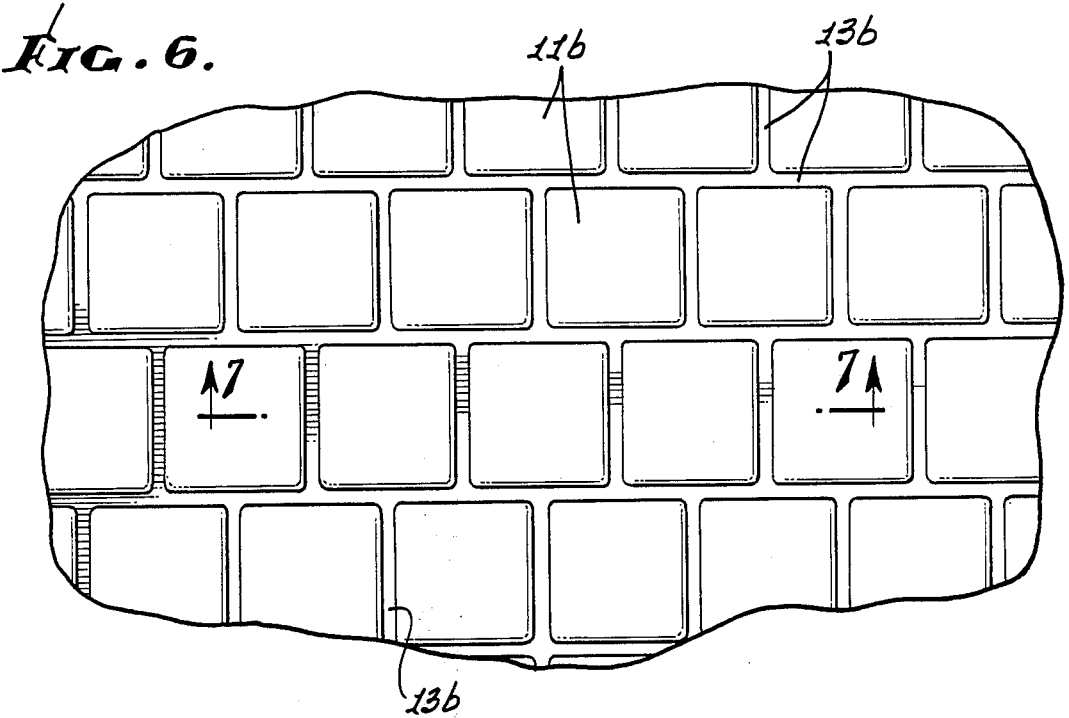
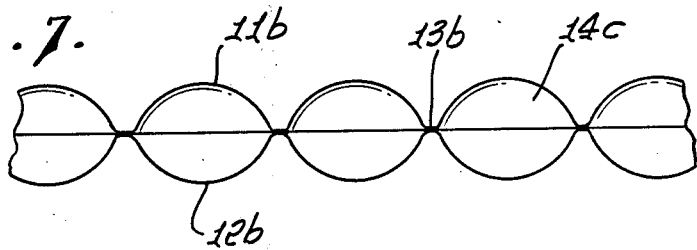
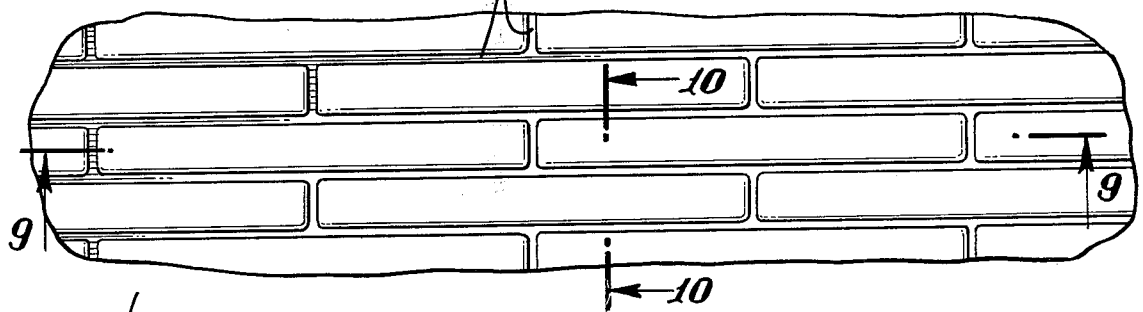
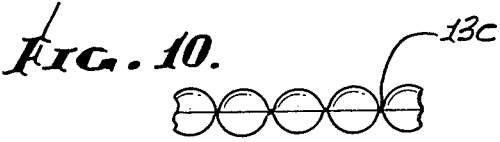

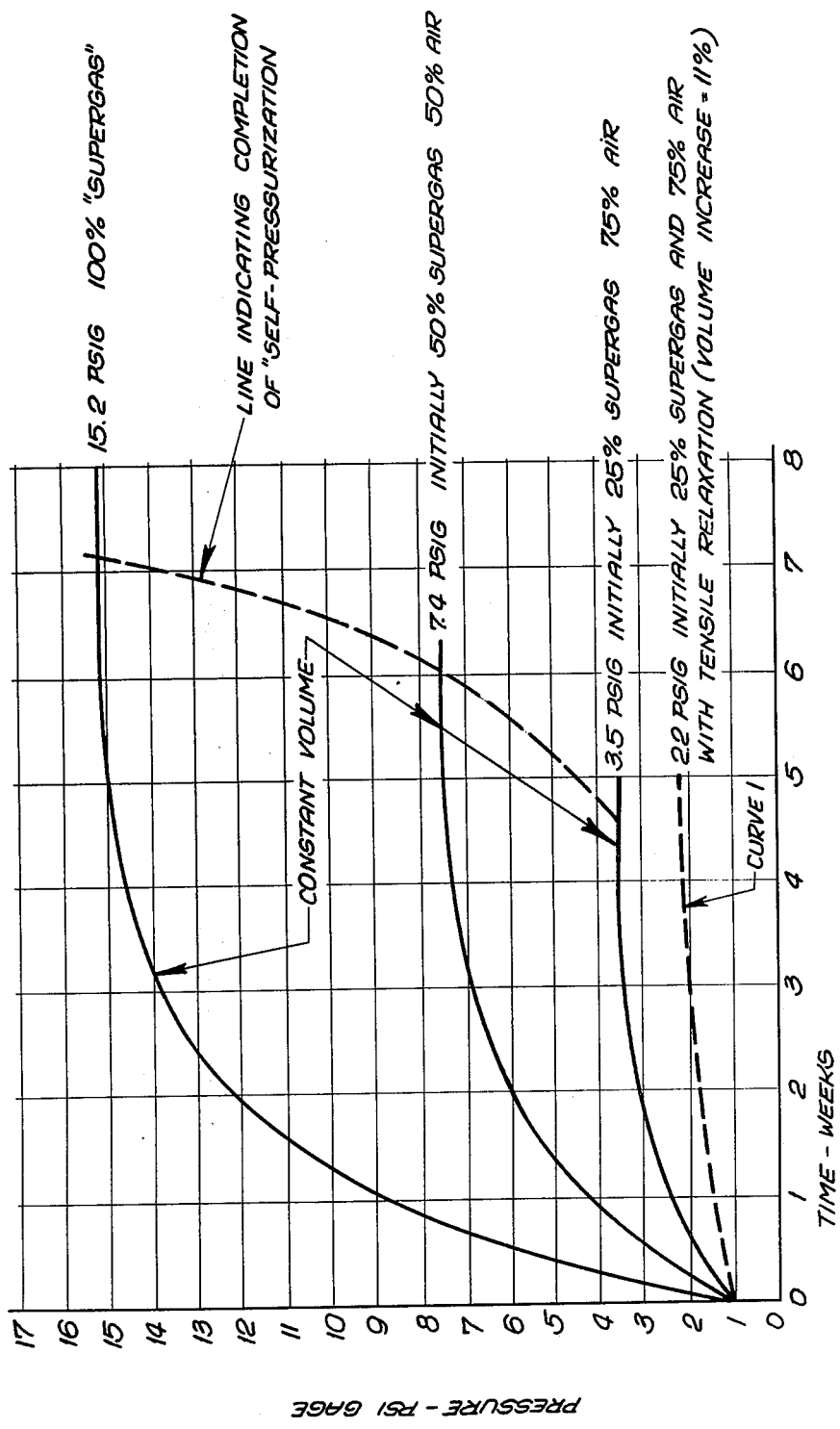

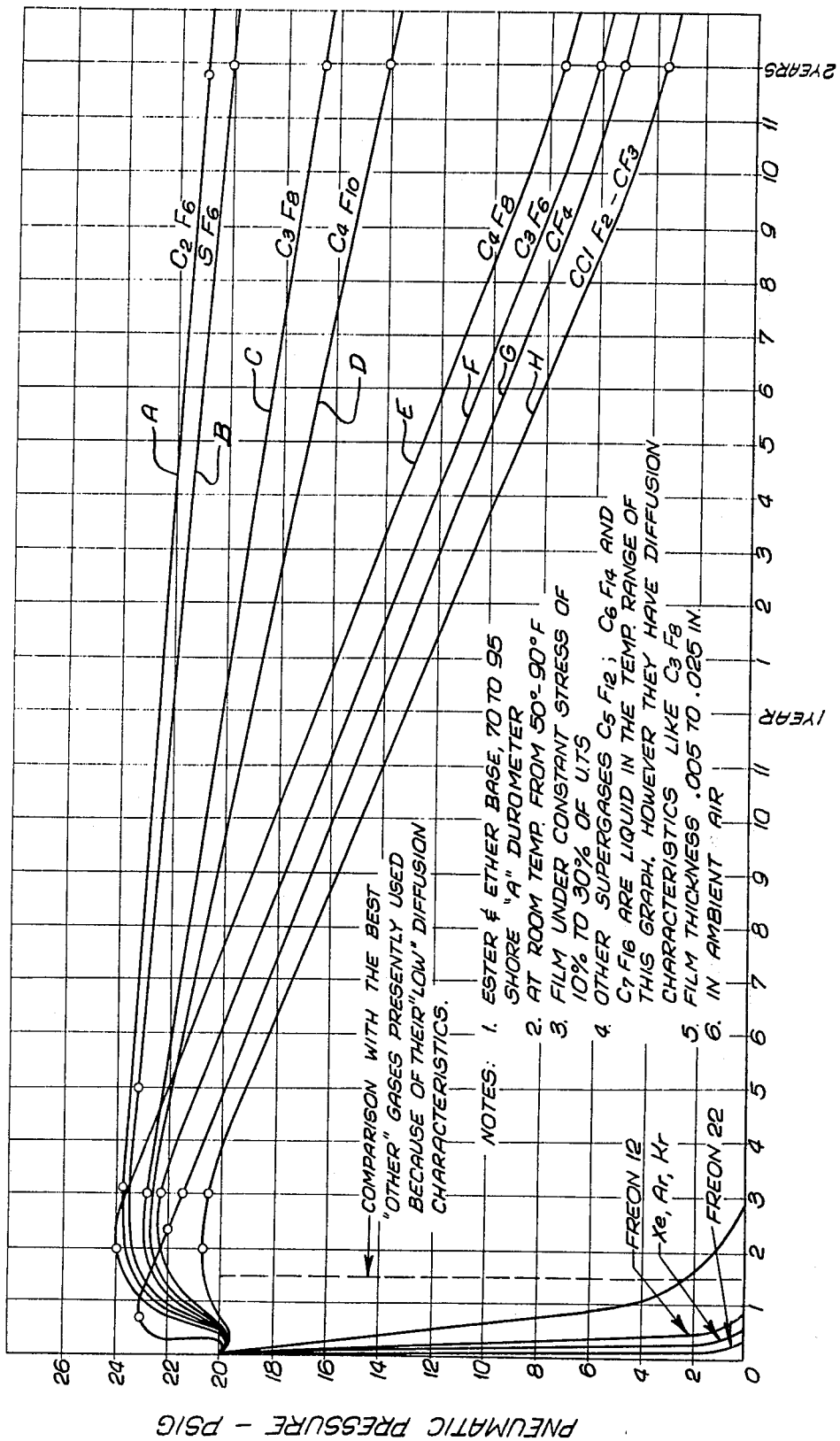

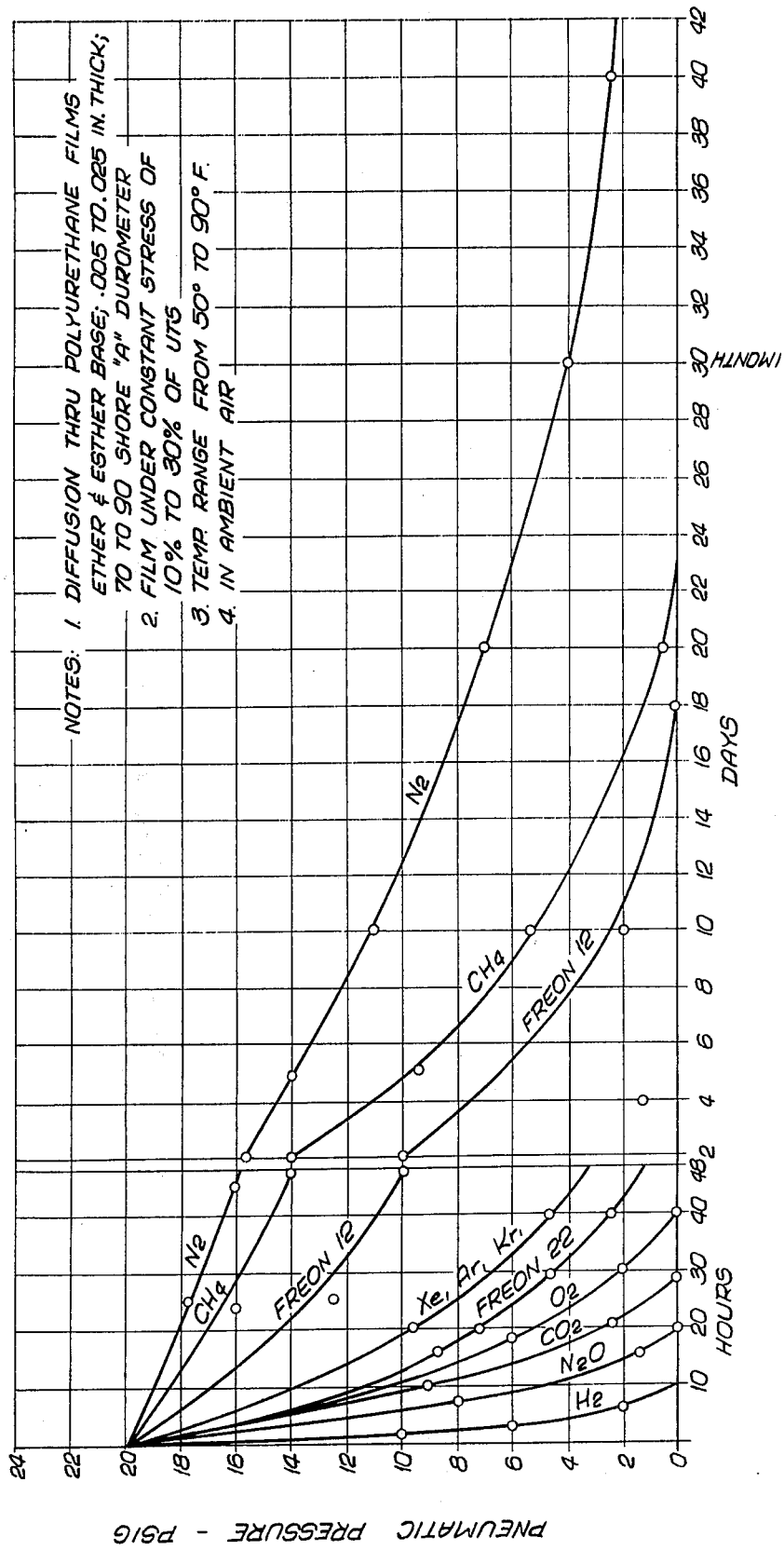

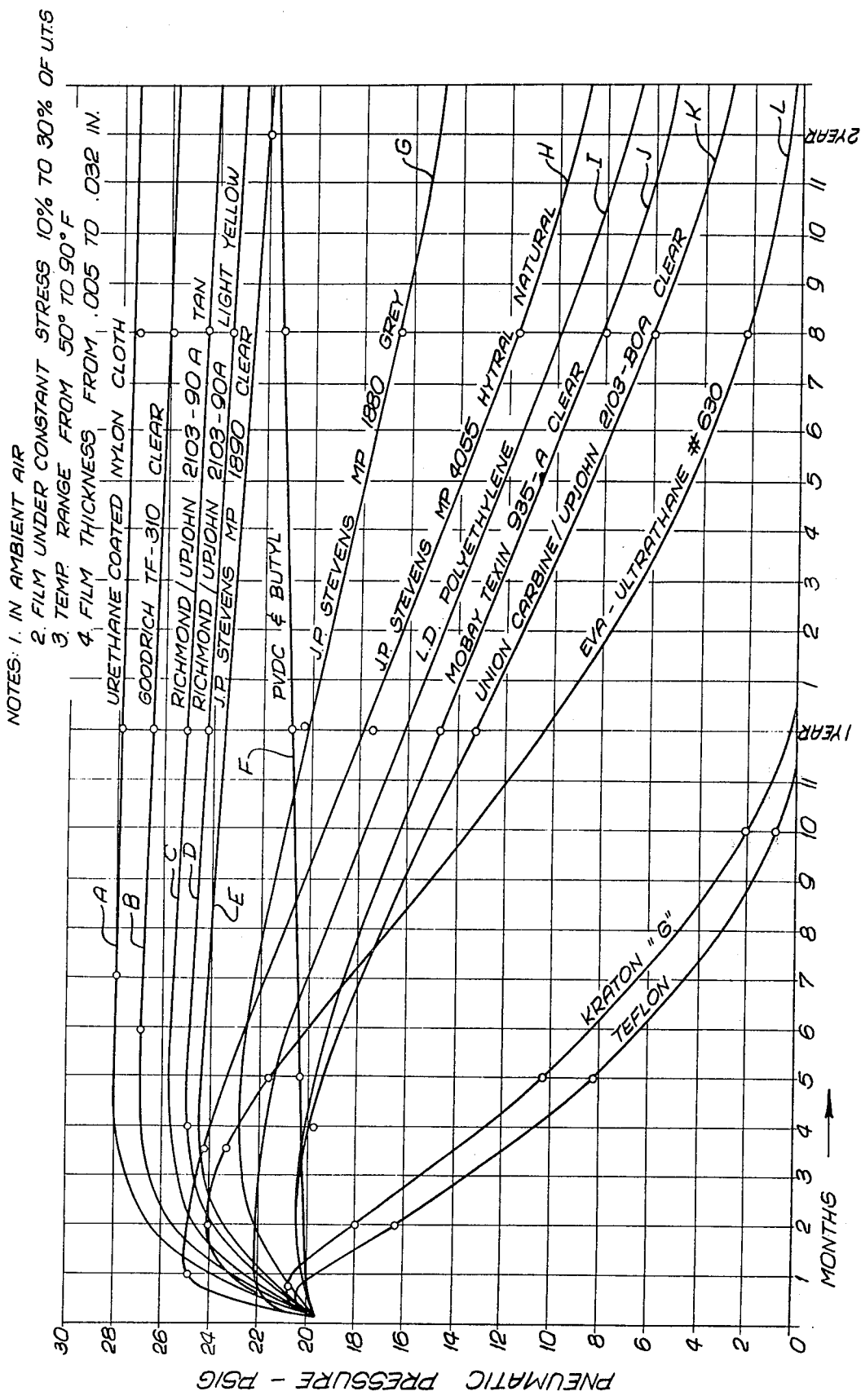

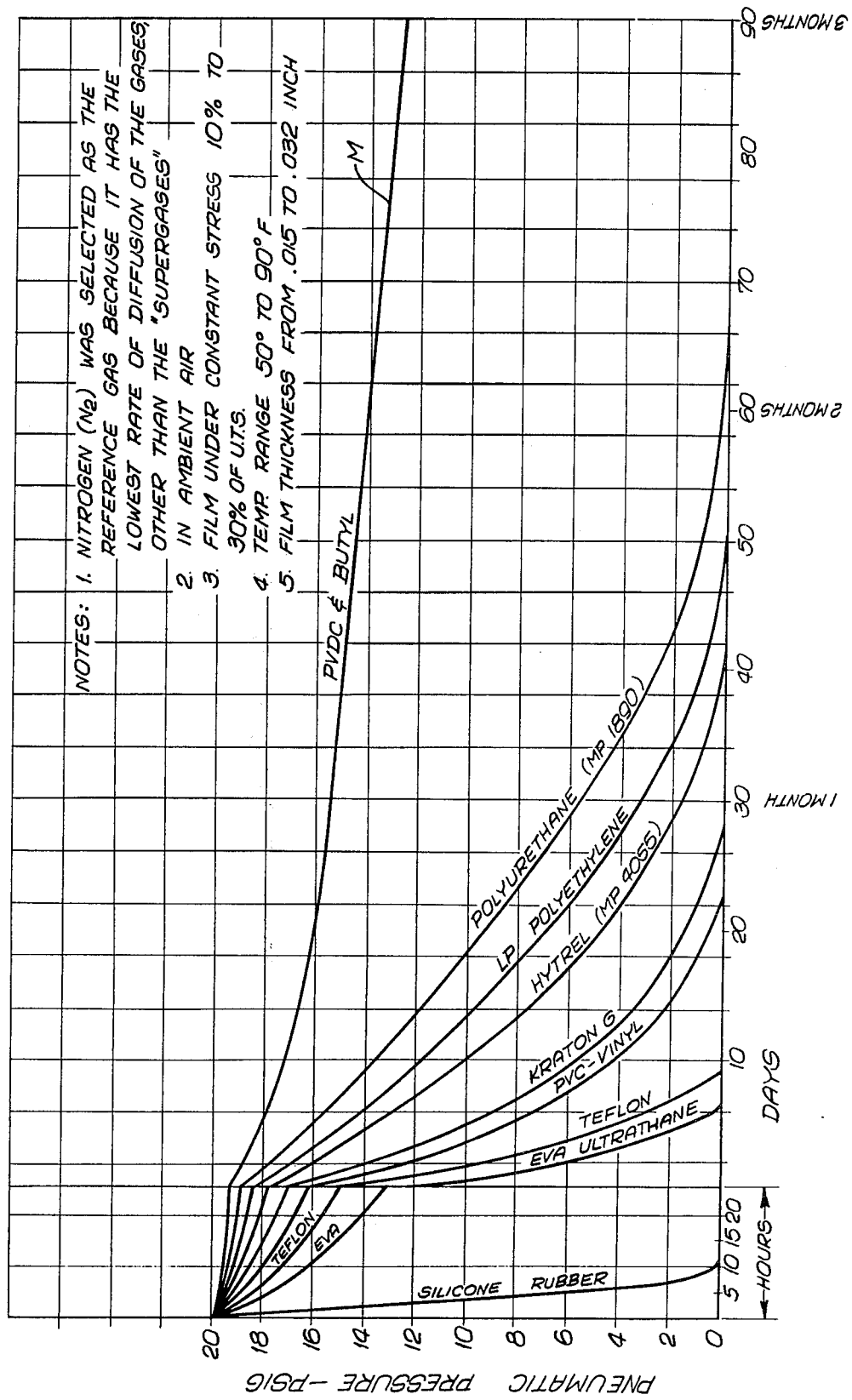

ELASTOMERIC CUSHIONING DEVICES FOR PRODUCTS AND OBJECTS

This application is a continuation in part of application Ser. No. 844,080, filed Oct. 20, 1977, now abandoned for "Elastomeric Cushioning Devices For Products And Objects".

The present invention relates to devices for protecting products or objects, and more particularly to cushioning devices having yieldable chambers filled with a gaseous medium and functioning to protect objects and products to prevent damage thereto.

Heretofore, packaging materials have been provided which are made by heat-sealing air-containing chambers between plastic sheets to provide cushioning protection for the products during handling and shipping. The chambers are separate and discrete and usually either cylindrical or spherical in shape, containing air at atmospheric pressure. The sheets are usually non-elastomeric and comprised of laminations of several layers of films, with one or more of the layers being barrier material (like PVDC Saran), and one or more of the other layers being heat-sealable.

Thin-film, single layer (unlaminated) elastomeric films have not proved practical for use as a cushioning material because such films have relatively high gaseous diffusion rates for most gases. The gas-filled chambers go "flat" in an unacceptable short time period when any pressure differential whatsoever exists between the gas inside the enclosure and the surrounding atmosphere. As an example, if the chambers are formed by inflating and elastically stretching the film, they lose about fifty percent of their original volume in approximately one to four weeks from the date of manufacture, and in about six months the chambers are essentially flat. Laminated films are only marginally heat-sealable and have relatively poor physical properties, except for prohibitively expensive films. Barrier films having low diffusion rates for most gases are used to prevent the air from being squeezed out of the chambers when external loads are applied over protracted periods of time, or when the material is subject to elevated temperatures.

In present products, the chambers are pre-formed and then partially inflated only, thus forming somewhat wrinkled non-pressurized enclosures to allow for expansion and contraction of the contained gas, so that the cushioning product can be carried in airplanes without over inflating and rupturing. One type of known cushioning device is disclosed in U.S. Pat. No. 3,589,037.

Because thin laminated barrier-type material is used in present cushioning devices, the cushioning material fails by rupturing when the internal pressure in each chamber exceeds more than about 3 to 4 psig. Since laminated barrier material is difficult to heat seal, the welds integrating sheets to one another are weak and deteriorate with age or temperature. Accordingly, prior cushioning devices are limited in the steady state loads they will support. As an example, one hundred fifty pounds per square foot loading is often specified as a maximum. Moreover, they are seriously limited in the dynamic (shock) loads they can withstand without rupture and loss of air. As a result, use of cushioning devices is normally limited to protecting light weight products only, such as instruments, electronic components, and the like.

Attempts have been made to use prior cushioning devices outside of the packaging field, e.g. for resilient, shock absorbing insoles in shoes, cushioning material to replace foam in boots, protective padding for athletic gear, and the like. These attempts have not been successful because of the fragile nature of the material and the marginal strength of the welds, as well as the basic problem of large volume changes caused by changes in altitude.

It is an object of the present invention to provide an improved, permanently inflated cushioning device made from high-strength, fatigue resistant elastomeric material having high structural strength and the ability to withstand high steady-state loads and large shock loads, as well as having very good resistance to the repeated application of extreme cyclical loading combined with severe flexing.

Another object of the invention is to provide an elastomeric cushioning device having a plurality of separate and discrete chambers inflated with gas, and in which changes in atmospheric pressure and temperature variations do not result in rupture of the individual pneumatic chambers or cells, despite increase in the gas pressure within the chambers and small changes in their volume, the cushioning device being durable, reliable, and having a long service life.

In its general aspects, cushioning devices embodying the invention include a pair of elastomeric, permeable sheets sealed together at desired intervals to form communicating or discrete chambers which are filled or inflated, partially or entirely, with a gas, or a mixture of gases, to a prescribed pressure, which may be atmospheric or above atmospheric. The gas or gases selected have very low diffusion rates through the permeable sheets to the exterior of the chambers, the surrounding air having a relatively high diffusion rate through the sheets into the chambers, producing an increase in the total pressure in the chambers, resulting from the addition of the partial pressure of the air therein to the partial pressure of the gas or gases therein. Although the pressure of the gas or gases initially placed in the chambers may decrease at a very slow rate, because of diffusion of such gas or gases through the elastomeric sheets, the ambient air diffuses more readily through the sheets into the chambers, to effect an increase in total pressure in the chambers above the initial inflation pressure of the gas or gases in the chambers. This total pressure in the chambers may decrease over an extended period, but it will still remain above the initial inflation pressure of the gases for a long time, and will lose pressure very slowly over an additional extended time period, during which the cushioning device is still effective to perform its cushioning or shock absorbing function.

The cushioning devices have application other than in the cushioning field. The devices can be formed as athletic floor mats, shaped to function as life preservers, handle grips for vibrating tools, and as shipping pallets, where they are disposed between two rigid members.

Other devices embodying the invention are those which are intermittently subject to loading, such as permanently inflated pillows and permanently inflated cushioning to replace foam pads in upholstered furniture. When a person sits or lies on such devices, some of the air in the chambers will be diffused outwardly from the chambers, but when the load is removed, the air will be replaced by air diffusing back into the pillow chambers, automatically effecting their reinflation and placing them in condition to appropriately receive the next cycle of loading. Other applications of cushioning devices will be referred to later on in the specification.

This invention possesses many other advantages and has other purposes which may be made more clearly apparent from a consideration of several forms embodying its principles. These forms are shown and described in the present specification and in the drawings accompanying and constituting a part thereof. They will now be described in detail, for the purpose of illustrating the general principles of the invention; but it is to be understood that such detailed description is not to be taken in a limiting sense.

BRIEF DESCRIPTION OF THE DRAWINGS

FIG. 1 is a top plan view of a portion of a cushioning or shock absorbing device embodying the invention;

FIG. 2 is a section taken along the line 2—2 on FIG. 1, the cushioning device being made of thin elastomeric film material, and disclosing spherical chambers of the cushion device inflated to relatively high pressure;

FIG. 3 is a view corresponding to FIG. 2 of a cushioning device which may be made of thicker, higher modulus elastomeric material, and disclosing spheroidal chambers of the device;

FIG. 4 is a top plan view of another embodiment of cushioning or shock absorbing device;

FIG. 5 is a section taken along the line 5—5 on FIG. 4;

FIG. 6 is a top plan view of yet another embodiment of cushioning or shock absorbing device;

FIG. 7 is a section taken along the line 7—7 on FIG. 6;

FIG. 8 is a top plan view of a further embodiment of cushioning or shock absorbing device embodying the invention, which can also function as a seal or gasket;

FIG. 9 is a section taken along the line 9—9 on FIG. 8;

FIG. 10 is a section taken along the line 10—10 on FIG. 8;

FIG. 12 is a graph similar to FIG. 11, showing the pressure rise due to self-pressurization of the elastomeric chambers with different mixtures of air and other gas initially in the chambers;

FIG. 13 is a graph representing pressures within intercommunicating elastomeric chambers of an insole over a period of time, in which different gases are used to initially inflate the chambers;

FIG. 14 is a graph, on an enlarged scale, of part of the left-hand portion of FIG. 13;

FIG. 15 is a graph representing the pressure within the intercommunicating chambers of the insoles over a period of time, the insole being made of different elastomeric materials and inflated initially with the same gas ($C_2F_6$); and FIG. 16 is a graph similar to FIG. 15 illustrating the relatively faster rate at which nitrogen diffuses through representative polymer films.

Figure 11:
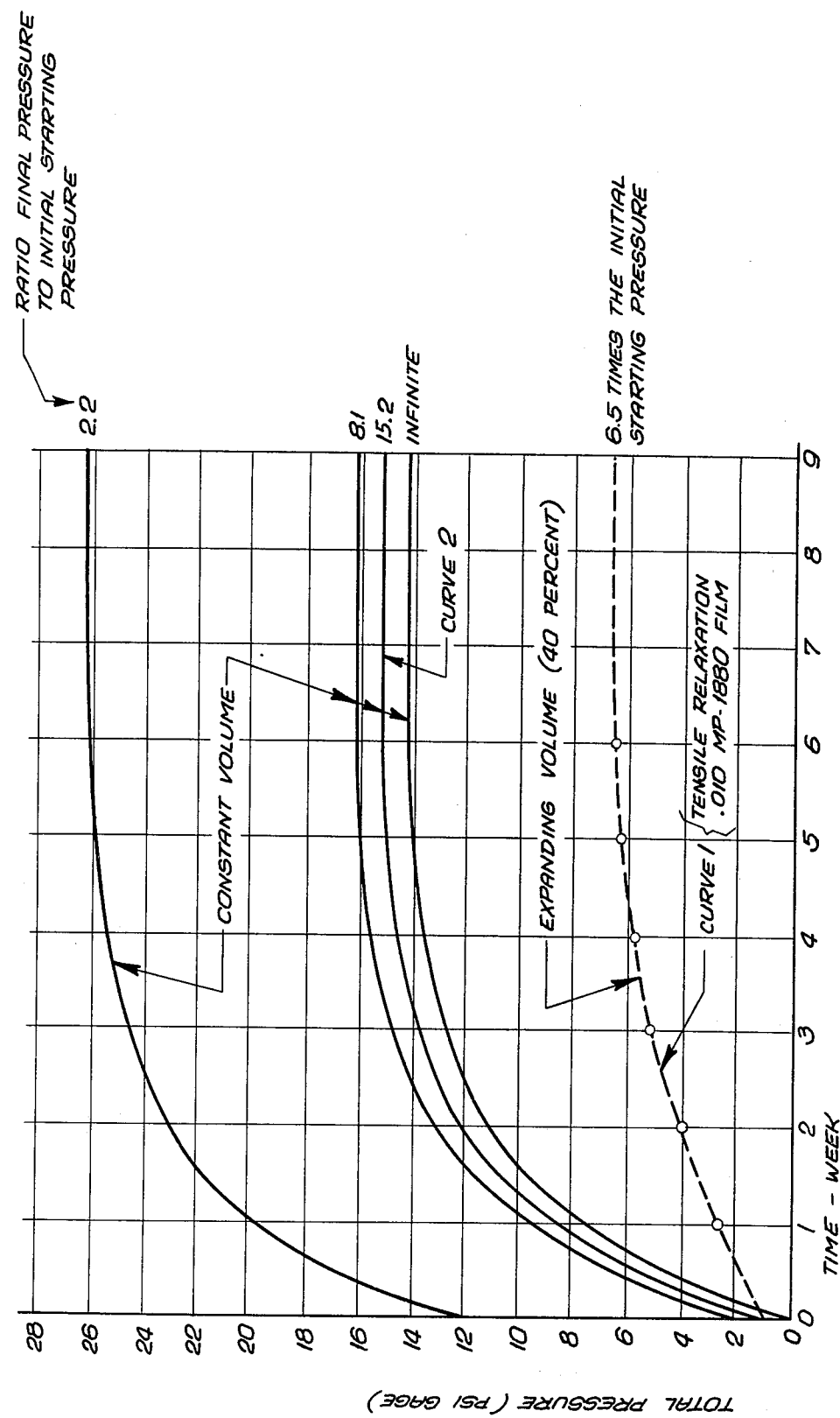
FIG. 11 is a graph showing the self-pressurization of the elastomeric chambers due to reverse diffusion of air into the chambers.

In the form of invention disclosed in FIGS. 1 and 2, a segment of a cushioning device 10 is illustrated, formed from two sheets 11, 12 of elastomeric material provided with circular welds 13 (as by use of radio frequency heat sealing techniques) to form discrete, spherical chambers 14, which are partially or completely inflated by a gas having a low diffusion rate through the material of which the elastomeric sheets are made. The spherical chambers shown in FIG. 2 result from providing thin elastic films or sheets 11, 12 of material, and then inflating them to relatively high pressures. As disclosed in FIG. 3, thicker, higher modulus films are used, which, when inflated to substantially the same pressure as the chambers disclosed in FIG. 2, will form spheroidal chambers 14a. The spheroidal chambers would also be formed with the thinner films shown in FIG. 2, provided the chambers were inflated to lower pressures than the pressures used in the chambers of FIG. 2.

As disclosed in FIGS. 4 and 5, the two sheets of elastomeric material 11a, 12a are welded to one another at circular locations 13a spacing the chambers from one another and surrounding each chamber. In one manner of making the product of FIGS. 4 and 5, the upper sheet 11a is first vacuum formed before welding to provide dome-ended cylindrical chambers 14b. While vacuum is still applied, the upper sheet and lower sheet are welded to one another in the circular pattern 13a disclosed. The desired gas is then introduced into the chambers forming the cylindrical chamber shapes 14b illustrated in FIG. 5.

In the cushioning device illustrated in FIGS. 6 and 7, the upper and lower sheets 11b, 12b are adhered to one another with a square weld pattern 13b to produce spheroidal chambers 14c. This square pattern at the weld region has a lesser overall weld area than the circular spherical design of FIGS. 1 and 2, providing a more complete and uniform pneumatic supporting surface.

In the cushioning device disclosed in FIGS. 8, 9 and 10, the welds 13c are provided in a rectangular pattern, as disclosed in FIG. 8. When pressurized, each chamber 14d is elongate, as disclosed in FIG. 9, and has a circular section, as disclosed in FIG. 10.

The elastomeric materials that can be used in forming the cushioning device preferably should have certain characteristics. One characteristic is excellent heat-sealability by various means especially through use of dielectric heat sealing techniques. Thus, high-strength, high integrity welds securing the sheets to one another can be obtained which can withstand high, steady-state stress levels, as well as long duration cyclical variation in stress and stress reversals, which occur under severe dynamic loading conditions. A second characteristic relates to appropriate physical properties of tensile strength, modulus of elasticity and tensile relaxation (creep). A third characteristic is very low permeability to the selected inflation gases/vapors (hereinafter sometime referred to as "supergas") but fairly high permeability to air ($N_2$ and $O_2$).

Another important factor in the cushioning devices is the group of special gases/vapors which are used for inflating the sheets or films. These gases/vapors are in a class by themselves as exhibiting extremely low diffusion rates through the special elastomeric materials, since they have very large molecules and very low solubility coefficients. The gases are inert, non-polar, of uniform/symmetric, spherical, spheroidal (oblate or prolate) or symmetrically branched molecular shape. They are non-toxic, non-flammable, non-corrosive to metals. They are excellent dielectric gases and liquids, have high levels of electronic attachment and capture capability, and exhibit remarkably reduced rates of diffusion through all polymers, elastomers and plastics (solid film).

When the special gases are used to inflate enclosures made from these special elastomeric materials, it is possible for the cushioning device to maintain the initial inflation pressure for very long periods of time without a significant loss in pressure. This is termed "permanent" inflation. "Permanent" inflation is a result of the combination of two important factors: (1) the extremely low permeabilities of the supergases combined with, (2) the phenomenon of "self-pressurization".

Many tests were conducted during a five-year period which confirmed the very low diffusion rates of the supergases through typical elastomeric films. The supergases tested were most of the gases/vapors from the group consisting of: hexafluoroethane, sulfur hexafluoride, perfluoropropane, perfluorobutane, perfluoropentane, perfluorohexane, perfluoroheptane, octafluorocyclobutane, perfluorocyclobutane, hexafluoropropylene, tetrafluoromethane, monochloropentafluoroethane, 1,2-dichlorotetrafluoroethane; 1,1,2-trichloro-1,2,2 trifluoroethane, chlorotrifluoroethylene, bromotrifluoromethane, monochlorotrifluoromethane, and monochlorodifluoromethane. The preferred gases/vapors are hexafluoroethane and sulfur hexafluoride.

Typical sheets or films tested were most of those from the group of materials consisting of: polyurethane, polyester elastomer, fluoroelastomer, chlorinated polyethylene, polyvinyl chloride, chlorosulfonated polyethylene, polyethylene/ethylene vinyl acetate copolymer, neoprene, butadiene acrylonitrile rubber, butadiene styrene rubber, ethylene propylene polymer, natural rubber, high strength silicone rubber, low density polyethylene, adduct rubber, sulfide rubber, methyl rubber, butyl rubber, and thermoplastic rubber. Polyurethane is the preferred material.

Most of the tests were conducted at relatively high pressures (20 psig) to accelerate the diffusion rate of the supergases, thereby making the tests conservative. In many of the tests, after two years of testing, the pressure in the chambers still exceeded the initial inflation pressure. In all of the tests, the pressure decline was extremely slow. At relatively low inflation pressures of a few ounces to a few pounds per square inch, this time would be extended by at least five times (from two years to ten years). In addition, for all of the tests the pressure actually rose significantly above the initial inflation pressure during the first two to four months of the tests. It is this pressure rise phenomenon which is termed "self-pressurization".

Self-pressurization is the result of the low permeability of the special films or sheet with respect to their resistance to the pressure of the supergases, coupled with the much higher permeability of the special films or sheets to the passage of air therethrough. The air in the natural atmospheric environment surrounding the inflated chambers diffuses into the chambers until the partial pressure of air inside the chambers is equal to the partial pressure outside the chambers (i.e. 14.7 psia). The total pressure within each chamber is the sum of the partial pressure of air plus the partial pressure of the supergas. Because essentially none of the supergas diffuses out while the air is coming in, a pressure rise of about 14.7 psi is possible within a constant volume enclosure made from one of the elastomeric materials.

FIG. 11 is a graph indicating the pressure rise in an actual preformed elastomeric enclosure typical of the new packaging or cushioning device, the enclosure being initially pressurized to 1.0 psig with one of the supergases, such as Freon 116. As is seen, the pressure after six weeks increased from 1.0 psig to 6.5 psig (Curve 1). This is a 650% rise in pressure, even though the enclosure stretched and its volume increased by approximately 40% during the test. Had the volume remained constant, the total pressure would have increased to 15.2 psig, with this particular supergas, as shown in Curve 2.

When the cushioning device is used for packaging materials, each pressurized chamber is inflated so as to operate at low pressures, normally less than 2.0 psig. Therefore, it is necessary to mitigate the increase in pressure due to self-pressurization. This can be done by inflating the chambers with mixtures of air and supergas. As Curve 1 of FIG. 12 indicates, a mixture of 25% supergas and 75% air in the elastomeric chamber enclosure results in a pressure rise of from 1.0 to 2.2 only. The pressure rise in a constant volume enclosure having mixtures of supergas and air of 25-75%, 50-50% and 100-0% are also shown in FIG. 12.

Further reduction in pressure rise can be achieved if the pressure chambers are not distended to the full, unstressed volume at initial inflation, but are in a wrinkled condition immediately after inflation. As the self-pressurization pressure rise occurs, the chamber volume expands and the pressure of the supergas falls. The key to this approach is to have the supergas partial pressure fall and arrive at the design pressure at the exact point when the chamber becomes fully distended. The ambient air passes through the elastomeric films into the chamber to increase the pressure therein. That is, the partial pressure of the air will add to the partial pressure of the supergas and produce the total pressure, which will be above zero psig. However, the volume of the chamber will expand, because of its initial wrinkled condition, expansion continuing as the self-pressurization continues until the final volume of the chamber is reached. This will take several weeks to occur to reach the stable condition and the desired final internal pressure, which, for example, may be ½ psig. The inward diffusion of the ambient air to reach the stable condition is referred to as "aging".

At the end of the aging, the pressure in the chamber is made of air at atmospheric pressure (14.7 psia) plus the partial pressure of the supergas. It is the partial pressure of the supergas which elevates and maintains the gauge pressure in the chamber above zero. If there were no supergas in the chamber, it would contain 100% air and the device would not function properly. During use with loads applied, the air would squeeze out of the chamber and the cushioning device would go flat, inasmuch as barrier materials are not used, as in other packaging materials. Accordingly it is the supergas which gives the device its permanent inflation characteristics, and the device must contain a sufficiently large percentage of supergas in the gas mixture to function properly throughout the duration of its useful life. Hence, the pressure in the device must be at least slightly higher than atmospheric pressure, the particular pressure depending on design loading conditions. From a manufacturing standpoint, it is desirable to fill the chambers with gases at atmospheric pressure. Because of the self-pressurization phenomenon, this can be done. After manufacturing is completed, the self-pressurization automatically elevates the pressure the desired amount above atmospheric pressure during the aging process.

As mentioned above, it is a relatively small percentage of supergas within the device which gives it its permanent inflation characteristics, and permits the device to be used under heavy load for extremely long periods of time without significant loss in pressure. The use of minimum quantities of supergas and maximum quantities of air reduces the cost of the cushioning device. The optimum amount of supergas depends upon the cycle. Heavy loads require higher concentrations of supergas.

The foregoing can be explained by the fact that when a load is applied, the cushioning device is commpressed somewhat and the pressure of both the supergas and air rises sufficiently to support the load. Because the pressure of the air is now above atmospheric pressure, it can gradually diffuse out of the chambers under load. The supergas will not diffuse out. As long as the load is applied, the air will continue to slowly diffuse out of the chambers and the chambers will slowly be compressed to smaller volumes, thereby raising the pressure of the supergas. The sum of the partial pressures of air plus supergas is always sufficient to support the load with the air pressure dropping and the supergas pressure rising. If the load is applied continuously and long enough (e.g. three to four months for normal load), the ultimate condition is reached where the partial pressure of the air has been reduced as far as it can go, that is, 14.7 psia (atmospheric pressure). The supergas pressure is then at its maximum value. The diffusion process will have stabilized and no more gas will diffuse out.

If the load is removed, the "self-pressurization" phenomenon will take over, and the air will diffuse inwardly, the pressure within the chambers returning to the original no-load condition. The cushioning device, therefore, has a self-compensating and self-restoring characteristic.

In normal use, loads will usually not be applied long enough to even approach the ultimate condition described above. However, it is desirable that the device continue to function properly even under the worst conditions for "bottoming-out". To ensure that the chambers will never "bottom-out", the chambers should contain a large enough percentage of supergas in the no-load condition so that in the worse condition (when the air volume has been reduced as far as it can go) the chambers still contain an acceptable volume of gas.

The "self-restoring" or "self-reinflation" ability of the cushioning device is applicable to devices which are intermittently loaded, such as permanently inflated pillows and permanently inflated cushioning to replace foam pads in upholstered furniture. Only relatively minute quantities of supergas are required in the air-supergas mixture in the air chambers to provide support under load. Some air will diffuse out while a person sits on the pillow or inflated furniture, but when the load is removed (especially overnight) the air diffuses back into the pillow or pad, which automatically reinflates itself to be ready for the next cycle of loading.

Changes in altitude affect the elastomeric cushioning devices. At high altitudes, the ambient pressure is low and the difference in pressure between the pressure within the chambers and the pressure external thereof is much higher than at sea level. With barrier material type products of the prior art, flown in airplanes in which the cabins are usually pressurized to about 5,000 to 8,000 foot elevation, the air chambers expand greatly and may burst. With the elastomeric products embodying the present invention, pressure increases do not have any impairment in performance because of their superior physical characteristics and the higher integrity of the welds. If left at high altitudes, such as may occur in Denver, Colorado, the air in the chambers would soon diffuse outward and the product would return toward its initial inflated condition. Correspondingly, the lowering of the cushioning devices to lower altitudes, or to sea level, will result in the diffusion of the ambient air back into the chambers.

Other applications for the cushioning devices outside the industrial packaging field are as a lightweight, highly durable cushioning member for shoes and boots, such as ski boots and shoetype skates, such as hockey skates and roller skates. The permanently inflated product is made with appropriate configurations to surround the foot and lower leg as an improved cushioning member to replace foam padding in boots. Another application of the cushioning device is as a permanently inflated tongue to fit over the instep portion of the foot.

The permanently inflated cushioning device may be used as an insole or boot liner, overcoming the deficiencies of prior products and providing much better resiliency, shock absorption and greater insulation against cold. An insole construction is disclosed and claimed in applicant's U.S. application, Ser. No. 830,589, filed Sept. 6, 1977, now U.S. Pat. No. 4,183,156.

Another use of the cushioning device of the present invention is to function as door and window seals, which can be used in lieu of prior art extruded rubber or foam plastic stripping. After a period of use, the foam packs down, losing its shape and resiliency. Seals embodying the present invention can be made from the long, narrow rectangular chambers disclosed in FIGS. 8 to 10, which can be cut and spliced into widths and lengths consistent with the particular sealing applications involved.

The elastomeric cushioning devices of the present invention also find application as a permanently inflated liner disposed between the shell of a helmet and the head of the wearer. The shock absorption characteristic is highly advantageous in helmets used for football, motorcycling, and similar activities. If these helmets are designed to have a rigid (but lightweight) external shell used in conjunction with the permanently inflated liner, extreme severe shock loads of over 1500 G's can be attenuated to under 125 G's. Tests have been conducted with a motorcycle helmet in accordance with the U.S. Department of Transportation procedures. In these tests, a helmet with a simulated head therein is dropped onto a steel hemispherical anvil from a height of approximately 8 feet. The Department of Transportation specifications call for a peak shock not to exceed 800 G's for two milliseconds. The cushioned liner embodying the present invention meets and exceeds this specification by a substantial margin. As far as is known, no other helmet has successfully met the Department of Transportation requirements.

In the same manner, the cushioning device can be made and used as padding for athletic gear, such as football shoulder pads, kidney pads, leg pads, and for similar pads in other sports, such as hockey, baseball, and the like.

In applicant's application Ser. No. 903,055, filed May 5, 1978, now U.S. Pat. No. 4,174,646, for "Diffusion Pumping Apparatus", graphic representations are included of the results obtained through use of supergases introduced into the chambers of members of permeable elastomeric material and those obtained when gases are introduced into the chambers which do not have the desirable characteristics of the supergases. The data for the graphs were obtained from numerous tests conducted over a five year period on insole constructions illustrated in FIG. 1 of application Ser. No. 830,589 and in FIGS. 1 and 2 of application Ser. No. 903,055, and in which the chambers were pressurized with various large moleclude low solubility coefficient gases shown in the graphs of FIGS. 13 and 14. The curves were arrived at by plotting pneumatic pressure above atmospheric against time, the sheets or film material used in making the insole being polyurethane. In curve A, the inflation gaseous medium was hexafluoroethane ($C_2F_6$), in which the initial inflation pressure was 20 psig. It should be noted that the pressure within the chambers first dropped slightly over a period of about one week and then began rising, reaching a maximum pressure in a little over three months of about 23.6 psig. The initial fall in pressure is believed to be due to the initial increase in volume of the chambers 13 as a result of tensile relaxation of the elastomeric material. After reaching a peak, the pressure then declines very gradually, having a value of about 21 psig after a total elapsed time of two years. The maintenance of the pressure over such an extended period is believed to have been due to the inward diffusion of nitrogen, oxygen, and argon into the chambers of the insole made of polyurethane.

The results of inflation tests using other large molecule inflation gases are shown in curves B, C, D, F, G and H, the specified gases being identified on each curve. In each case, the pressure at first increased and then declined at a very low rate. In curve B, depicting inflation with sulfur hexafluoride ($SF_6$), the pressure within the chambers dropped to about 20 psig after two years. Octafluorocyclobutane ($C_3F_8$), curve C, had declined in total pressure to 20 psig after one year and to about 16.5 psig after two years. The gas of curve D declined to 14 psig after two years. Where the decline in a period of two years drops below 20 psig, as in curves C and D, the total pressure remaining in the enclosures was still adequate to properly support the foot of the wearer.

As constrasted with the gases shown in curves A to H, inclusive, the gases shown at the left portion of FIG. 13 lost pressure relatively rapidly. The lower left end portion of FIG. 13 is shown on a greatly enlarged scale on the graph, FIG. 14. In each case, the polyurethane enclosures were inflated to 20 psig. Chambers inflated with hydrogen, nitrous oxide, carbon dioxide or oxygen lost all of their pressure within 10 to 40 hours, the chambers becoming "flat" or fully deflated. The chambers inflated with Freon 22 ($CHClF_2$) lost all of their pressure within about three days, xenon, argon and krypton within less than six days, Freon 12 ($CCl_2F_2$) within 18 days, and methane ($CH_4$) within 22 days. The chambers initially inflated to 20 psig with nitrogen lost pressure, which declined to a little more than 2 psig after 40 days. In all of these cases, the initially inflated chambers became ineffective over relatively short periods of time, when compared with the pressure retentions in the chambers when inflated with the gases shown in curves A to H, inclusive, of FIG. 13. Of the gases identified in FIG. 14, nitrogen has the lowest diffusion rate from the permeable enclosures, but such diffusion rate is still in excess of ten time the diffusion rates of the supergases of FIG. 13 from the permeable enclosures. In fact, the diffusion rates of $C_2F_6$ and $SF_6$ (Curves A and B) are so low that the total pressure in the enclosures is equal to or above the initial inflation pressure of 20 psig after two years has elapsed. Enclosures inflated with nitrogen initially to 20 psig were "flat" in less than three months.

The gases used for initially inflating the elastomeric chambers are incapable of diffusing outwardly from the chambers except at an exceedingly slow rate. The gases are the supergases previously referred to herein, and do not include air, oxygen or nitrogen which would diffuse outwardly from the chambers at an exceedingly high rate, as shown in FIG. 14.

The supergases have the following common characteristics: unusually large macromolecules, very low solubility coefficients, inert, non-polar, uniform/symmetric, spherical, speroidal (oblate or prolate) or symmetrically branched molecular shape, non-toxic, non-flammable, non-corrosive to metals, excellent dielectric gases and liquids, high level of electron attachments and capture capability, man-made, exhibit remarkable reduced rates of diffusion through all polymers, elastomers and plastics (solid film). Normally, as gas, liquids, or vapor molecules become larger, they also become more polar. The opposite is true with the supergases. They are among the least polar and most inert of all gases.

Typical sheets or films for producing the insoles and other chambered devices, and which function properly with respect to the supergases have been identified hereinbefore in this application.

In the curves shown in FIGS. 13 and 14, diffusion rates of supergases through polyurethane barriers are set forth. In FIG. 15, a graph is presented showing the diffusion rates of hexafluoroethane through a variety of representative polymer barrier films. To obtain the data for each curve, each chamber was pressurized to 20 psig. As shown in curve A, a pressure increase of 8 psig was obtained in about five months, where the barrier film was urethane coated nylon cloth, the pressure dropping to a total pressure of about 27.4 psig in about two years. Pressure increases to maximum values above 20 psig and then declines therefrom are also depicted in curves B, C, D, E and F for the barrier materials identified thereon. Within two years the total pressure bearing against the barrier film was still in excess of the intiial pressure of 20 psig. The pressure in the polymer barrier films shown in curves G, H, I, J, K and L all increased to some extent above the initial pressure to 20 psig, but then declined from the greater pressure to below 20 psig as indicated in the graph.

FIG. 16 is a graph on an expanded scale showing the diffusion rate of nitrogen, initially under a pressure of 20 psig, through representative polymer barrier films identified in the graph. The comparatively high rate of diffusion of nitrogen through the barrier films results in the pressure of the remaining nitrogen gas in the chamber being substantially at zero gage within a maximum period of two months, except for the PVDC and Butyl, shown in curve M of FIG. 16.

The diffusion of the ambient air into an insole inflated initially with a supergas is well supported by an analysis of the gases in an insole of the type illustrated in FIG. 1 of application Ser. No. 830,589, and which was initially inflated on Dec. 10, 1975 to a pressure of 22 psig with pure sulfur hexafluoride gas. On Jan. 24, 1978, or slightly more than two years after the initial inflation, the pressure in the insole was checked and was found to be 19.5 psig. In the approximate elapsed time of two years, the insole increased in thickness by about 15.3%, indicating that the volume of the chambers in the insole had increased. Had the volume remained constant, the pressure in the insole after approximately two years would have been greater than the measured pressure of 19.5 psig.

The gases in the above insole were analyzed by mass spectroscopy in the latter part of January, 1978. The analysis showed that the insole contained 52% air by volume (nitrogen, ozygen, and argon in the same ratio as these elements appear in ambient air), 47% sulfur hexafluoride by volume, and 0.6% carbon dioxide by volume. Whereas, the gas initially introduced into the insole chambers was 100% sulfur hexafluoride, the analysis demonstrated that in a period of two years, air had been diffusion pumped through the elastomeric enclosure to its interior, while a small portion of the original sulfur hexafluoride had diffused through the elastomeric material of the insole to the atmosphere.

The 0.6% carbon dioxide found to be present in the insole chambers is approximately twenty times the amount normally found in ambient air. The relatively large amount of carbon dioxide is typical of urethanes and is due to outgasing from the urethane film from the basic reagent thereof.

The reverse of inward diffusion of ambient air into the insole or other specific devices containing supergas initially results in the maintenance of the total gage pressure in the insole at or near the initial inflation pressure, which, for example, is about 20 psig. However, a large difference in the makeup of the gas pressure contributing to the total gage pressure has taken place after the insole has been inflated. Initially, 100% of the gage pressure (and also the absolute pressure) within the insole comes from the supergas ($SF_6$). After two years, the volume of the insole has increased 25-40% due to stretching of the highly stressed envelope forming the insole chambers. There has also been a small amount of pressure loss caused by the outward diffusion of the supergas from the chambers. Yet, the useful gage pressure is essentially unchanged, except for an intervening modest pressure rise during about the first two months following initial inflation (see FIG. 13). As the above mass spectroscopy analysis shows, 50% or more of the useful total pressure in the insole comes from the pressure of the ambient air that has diffused into the system. Thus, it is conclusively demonstrated that the diffusion pumping phenomenon is taking place, and the pressure rise shown is not the result of other mechanisms, such as a chemical reaction of the gas with the film or outgasing of the film.

I claim:

1. A cushioning device exposed to air at atmospheric pressure, comprising opposed layers of permeable elastomeric sheet material surrounded by air at atmospheric pressure, said layers being sealed to each other at predetermined locations to provide a multiplicity of adjacent chambers of predetermined size and shape between said layers, said chambers being inflated with a gaseous medium to a desired initial value, said gaseous medium in said chambers comprising an inert, non-polar gas other than air, oxygen or nitrogen having a very low solubility coefficient, said layers of sheet material having characteristics of relatively low permeability with respect to said gas to resist diffusion of said gas from said chambers through said layers of sheet material and of relatively high permeability with respect to the ambient air surrounding said layers to permit diffusion of said ambient air through said layers into said inflated chambers to provide a total pressure in each chamber which is greater that the initial inflation pressure of said gas and is the sum of the partial pressure of the gas in each chamber and the partial pressure of the air in each chamber, the diffusion rate of said gas through said layers of sheet material being substantially lower than the diffusion rate of nitrogen through said layers of sheet material.

2. A cushioning device as defined in claim 1, said adjacent chambers being discrete and separate from one another.

3. A cushioning device exposed to air at atmospheric pressure, comprising opposed layers of permeable elastomeric sheet material surrounded by air at atmospheric pressure, said layers being sealed to each other at predetermined locations to provide a multiplicity of adjacent chambers of predetermined size and shape between said layers, said chambers being inflated with a gaseous medium under pressure to a desired initial value, said gaseous medium in said chambers comprising a gas, said layers of sheet material having characteristics of relatively low permeability with respect to said gas to resist diffusion of said gas therethrough from said chambers and of relatively high permeability with respect to the ambient air surrounding said layers to permit diffusion of said ambient air through said layers into each of said chambers to provide a total pressure in each chamber which is greater then the initial inflation pressure of said gas and is the sum of the partial pressure of the gas in each chamber and the partial pressure of the air in each chamber, said gas being either hexafluoroethane, sulfur hexafluoride, perfluoropropane, perfluorobutane, perfluoropentane, perfluorohexane, perfluoroheptane, octafluorocyclobutane, perfluorocyclobutane, hexafluoropropylene, tetrafluoromethane, monochloropentafluoroethane, 1,2-dichlorotetrafluoroethane, 1,1,2-trichloro-1,2,2-trifluoroethane, chlorotrifluoroethylene, bromotrifluoromethane, or monochlorotrifluoromethane.

4. A cushioning device as defined in claims 1 or 3, wherein said elastomeric material is either polyurethane, polyester elastomer, butyl rubber, fluoroelastomer, chlorinated polyethylene, polyvinyl chloride, chlorosulfonated polyethylene, polyethylene/ethylene vinyl acetate copolymer, neoprene, butadiene acrylonitrile rubber, butadiene styrene rubber, ethylene propylene polymer, natural rubber, high strength silicone rubber, low density polyethylene, adduct rubber, sulfide rubber, methyl rubber, or thermoplastic rubber.

5. A cushioning device as defined in claim 2, wherein said elastomeric material is either polyurethane, polyester elastomer, butyl rubber, fluoroelastomer, chlorinated polyethylene, polyvinyl chloride, chlorosulfonated polyethylene, polyethylene/ethylene vinyl acetate copolymer, neoprene, butadiene acrylonitrile rubber, butadiene styrene rubber, ethylene propylene polymer, natural rubber, high strength silicone rubber, low density polyethylene, adduct rubber, sulfide rubber, methyl rubber, or thermoplastic rubber.

6. A cushioning device as defined in claim 1, wherein said gas under pressure is hexafluoroethane.

7. A cushioning device as defined in claim 1, wherein said gas under pressure is sulfur hexafluoride.

8. A cushioning device as defined in claim 2, said chambers being of spherical shape.

9. A cushioning device as defined in claim 2, said chambers being of spheroidal shape.

10. A cushioning device as defined in claim 2, said chambers being of generally cylindrical shape.

11. A cushioning device as defined in claim 2, said chambers each having a portion of substantially square shape.

12. A cushioning device as defined in claim 2, said chambers each having a portion of rectangular shape.

13. A cushioning device as defined in claim 2, said chambers each having a portion of rectangular shape, some of said chambers being in staggered relation with respect to other of said chambers.

14. A cushioning device as defined in claims 1, 6 or 7, wherein said elastomeric material is an ether based polyurethane.

15. A cushioning device as defined in claim 2, said chambers being partially collapsed when inflated with said gas to said initial value.

16. A cushioning device as defined in claim 10, said chambers being partially collapsed when inflated with said gas to said initial value.

17. A cushioning device as defined in claim 8, wherein said layers are sealed to one another at spaced circular weld areas to form said spherical chambers upon inflation of said chambers.

18. A cushioning device as defined in claim 8, wherein said layers are sealed to one another at spaced circular weld areas to form said spheroidal chambers upon inflation of said chambers.

19. A cushioning device as defined in claim 10, wherein said layers are sealed to one another at spaced circular weld areas to form said generally cylindrical chambers upon inflation of said chambers.

20. A cushioning device as defined in claims 1 or 3, wherein said layers are sealed to one another at spaced weld areas to form generally dome shaped chambers, each chamber having a portion at the weld area of substantially square shape.

21. A cushioning device as defined in claim 1 or 3, wherein said layers are sealed to one another at spaced weld areas to form generally arch shaped chambers, each chamber having a portion at the weld area of substantially rectangular shape.

22. A cushioning device as defined in claim 17, said chambers being partially collapsed when inflated with said gas to said initial value.

23. A cushioning device as defined in claim 18, said chambers being partially collapsed when inflated with said gas to said initial value.

24. A cushioning device as defined in claim 19, said chambers being partially collapsed when inflated with said gas to said initial value.

25. A cushioning device as defined in claims 1 or 3, said initial inflating gas being diluted with air to form an initial chamber inflating mixture therewith having a pressure above atmospheric.

26. A cushioning device as defined in claims 1 or 3, said ambient air diffusing through said layers into said chambers and increasing the pressure in said chambers above said initial value.

27. A cushioning device as defined in claims 1, 2 or 3; wherein the initial inflation pressure of said gaseous medium in said chambers is superatmospheric.

28. A cushioning device as defined in claims 1, 2 or 3; wherein the initial partial pressure of said gas in said chambers is superatmospheric.

* * * * *